US012768988B2

(12) United States Patent
Suleiman et al.

(10) Patent No.: US 12,768,988 B2
(45) Date of Patent: Oct. 20, 2026

(54) METHOD FOR CLASSIFYING OBJECTS

(71) Applicant: Continental Autonomous Mobility Germany GmbH, Ingolstadt (DE)

(72) Inventors: Wassim Suleiman, Kriftel (DE); Nicolai Glatz, Frankfurt am Main (DE); Abhishek Kekud, Frankfurt a. Main (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 94 days.

(21) Appl. No.: 18/847,248

(22) PCT Filed: Feb. 27, 2023

(86) PCT No.: PCT/DE2023/200042

§ 371 (c)(1),
(2) Date: Sep. 15, 2024

(87) PCT Pub. No.: WO2023/174495

PCT Pub. Date: Sep. 21, 2023

(65) Prior Publication Data

US 2025/0199168 A1 Jun. 19, 2025

(30) Foreign Application Priority Data

Mar. 15, 2022 (DE) ..................... 10 2022 202 524.5

(51) Int. Cl.
*G01S 15/42* (2006.01)
*G01S 15/931* (2020.01)

(52) U.S. Cl.
CPC ............ *G01S 15/42* (2013.01); *G01S 15/931* (2013.01); *G01S 2015/936* (2013.01)

(58) Field of Classification Search
CPC .. G01S 15/42; G01S 15/931; G01S 2015/936; G01S 2015/932; G01S 7/539
See application file for complete search history.

(56) References Cited

U.S. PATENT DOCUMENTS

2021/0088641 A1 3/2021 Kirsch
2022/0342061 A1* 10/2022 Pampus .................. G01S 15/10
2025/0199168 A1* 6/2025 Suleiman ................ G01S 7/539

FOREIGN PATENT DOCUMENTS

CN 203311473 U * 11/2013
CN 113552570 A 10/2021
(Continued)

OTHER PUBLICATIONS

Translation of DE102015101292 (Year: 2015).*
(Continued)

*Primary Examiner* — Daniel Pihulic
(74) *Attorney, Agent, or Firm* — Fitch, Even, Tabin & Flannery LLP

(57) ABSTRACT

A method for classifying objects into object classes on the basis of information of an ultrasonic sensor of a vehicle, including receiving multiple detections of a vehicles's ultrasonic sensor. Items of position information and directional information are assigned to each detection. The position information indicates a reflection location where an ultrasonic sensor's signal was reflected and the directional information indicates a direction along which the ultrasonic signal propagates between the reflection location and ultrasonic sensor. The method includes forming detection clusters based on the received detections, with one cluster including multiple detections; calculating statistical distribution information of the position information and the directional information of the detections assigned to the respective cluster; and classifying an object into an object
(Continued)

class based on the statistical distribution information of the position information and the directional information of the clusters.

15 Claims, 3 Drawing Sheets

(56) References Cited

FOREIGN PATENT DOCUMENTS

| | | | | | |
|---|---|---|---|---|---|
| DE | 102015101292 | A1 * | 8/2016 | | G01S 13/931 |
| DE | 102016113736 | A1 * | 2/2018 | | G01S 7/527 |
| DE | 102019215393 | A1 * | 4/2021 | | G01S 15/52 |
| DE | 102019215394 | A1 | 4/2021 | | |
| DE | 102020203856 | A1 | 9/2021 | | |
| DE | 102022202524 | A1 * | 9/2023 | | G01S 15/931 |
| DE | 102022202524 | B4 * | 4/2024 | | G01S 15/931 |
| EP | 2073038 | B1 | 9/2015 | | |
| EP | 2823331 | B1 | 11/2015 | | |
| JP | 2017151043 | A | 8/2017 | | |
| JP | 2017524132 | A | 8/2017 | | |
| JP | 2022552228 | A | 12/2022 | | |
| JP | 2025505298 | A * | 2/2025 | | G01S 15/931 |
| JP | WO2023174495 | A5 * | 9/2025 | | |
| JP | 7764626 | B2 * | 11/2025 | | G01S 15/931 |
| WO | 2021106030 | A1 | 6/2021 | | |
| WO | WO-2023174495 | A1 * | 9/2023 | | G01S 15/931 |

OTHER PUBLICATIONS

Translation of DE102016113736 (Year: 2016).*
Translation of DE102019215393 (Year: 2019).*
German Office Action dated Oct. 17, 2022 for the priority German Patent Application No. 10 2022 202 524.5 and machine translation of same.
The International Search Report and the Written Opinion of the International Searching Authority mailed on May 25, 2023 for the PCT Application No. PCT/DE2023/2000042 which this application claims priority.
German Notice of Allowance dated Oct. 17, 2022 for the priority German Patent Application No. 10 2022 202 524.5 and machine translation of same.
Japanese Patent Office; Office Action dated Jul. 30, 2025 from related Japanese App. No. 2024-548552; 6 pages (with machine English translation).

* cited by examiner

METHOD FOR CLASSIFYING OBJECTS

CROSS-REFERENCE TO RELATED APPLICATIONS

The present application is a National Stage Application under 35 U.S.C. § 371 of International Patent Application No. PCT/DE2023/200042 filed on Feb. 27, 2023, and claims priority from German Application No. 10 2022 202 524.5 filed on Mar. 15, 2022, in the German Patent and Trademark Office, the disclosures of which are herein incorporated by reference in their entireties.

TECHNICAL FIELD

The invention relates to a method for classifying objects into object classes.

BACKGROUND

The process of estimating the height of objects by means of geometric methods on the basis of information captured by ultrasonic sensor technology is known. For example, a linear object which refers to a curb can be distinguished from a linear object in the form of a wall by the height estimation.

The problem with height estimation is that the known methods for estimating heights lead to incorrect results when they are applied to objects in the form of vehicles.

SUMMARY

Proceeding herefrom, it is the object of the present disclosure to indicate an object classification method which makes it possible to reliably classify objects into predefined object classes.

The object is achieved by a method having the features of the independent Claim 1. Example embodiments are the subject-matter of the subclaims. A system for classifying objects into object classes on the basis of information of at least one ultrasonic sensor of a vehicle is the subject-matter of the alternative, independent Claim 14 and a vehicle having such a system is the subject-matter of the alternative Claim 15.

According to a first aspect, a method for classifying an object into an object class on the basis of information of at least one ultrasonic sensor is disclosed. The method includes the following steps.

Initially, multiple detections of at least one ultrasonic sensor of a vehicle are received. It is understood that the detections can be obtained by the interaction of multiple ultrasonic sensors. An item of position information and an item of directional information are assigned to each detection. The position information indicates the reflection location at which an ultrasonic signal of the at least one ultrasonic sensor was reflected. The position information can in particular include coordinates which indicate the reflection location. The directional information indicates the direction along which the ultrasonic signal propagates between the reflection location and the at least one ultrasonic sensor. The directional information can, for example, be indicated by an angle, in particular an azimuth angle.

The received detections are subsequently assigned to clusters, wherein one cluster includes multiple detections. The clusters therefore form groups of detections. One or more clusters can refer to one object, i.e., the detections which originate from one object can be assigned to one or more clusters.

Following the formation of the clusters, information on the statistical distribution of the position information and information on the statistical distribution of the directional information are calculated for the respective clusters, and indeed on the basis of the position information and the directional information of the detections assigned to the respective cluster.

Finally, the object is classified into an object class on the basis of the information on the statistical distribution of the position information and on the statistical distribution of the directional information of the clusters.

The technical advantage of the disclosed method is that the information on the statistical distribution of the position information and the information on the statistical distribution of the directional information of the clusters can be enlisted as decision aids regarding which object class a cluster, and therefore an object assigned to the cluster, are to be assigned to. Therefore, an accurate and efficient object classification can be achieved, in particular with the objective of excluding detections in clusters assigned to the object class "vehicle" from the height estimation.

According to an exemplary embodiment, the position information includes at least one first and one second coordinate. The information on the statistical distribution of the position information includes information which is based on the covariance matrix of the first and second coordinates of the position information. By taking account of the covariance matrix of the first and second coordinates of the position information, the distribution of the detections in a longitudinal direction and a transverse direction running perpendicularly thereto can in particular be enlisted for classification into the object classes. In particular, the determinant of the covariance matrix of the first and second coordinates of the position information can be enlisted as a decision criterion. This determinant is larger for two-dimensionally shaped objects (in particular, objects having curves and/or corners) such as, for example, vehicles than in the case of linear objects (e.g., curbs or wall objects).

According to an exemplary embodiment, the information on the statistical distribution of the position information includes the eigenvalues of the covariance matrix of the first and second coordinates of the position information. The eigenvalues of the covariance matrix of the first and second coordinates of the position information provide a measure of the extent of a cluster along its main and auxiliary axes, so that conclusions can be drawn about the shape of the object by way of the eigenvalues.

According to an exemplary embodiment, the information on the statistical distribution of the position information includes the ratio of the eigenvalues of the covariance matrix of the first and second coordinates of the position information. The ratio of the eigenvalues is very different for linear objects and two-dimensionally shaped objects and can thus be advantageously used as a decision-making basis.

According to an exemplary embodiment, the information on the statistical distribution of the directional information of the detections includes the variance of the directional information. The variance of the directional information is very low in the case of linear objects and is very high in the case of curved objects such as, for example, posts. In the case of vehicles, the variance of the directional information lies between the variance of linear objects and curved objects since the vehicle contour has both planar surfaces and curved surfaces.

According to an exemplary embodiment, the information on the statistical distribution of the directional information of the detections includes the derivative over time of the directional information. As a result, the change in the directional information over time can be used as a decision-making basis for the object classification.

According to an exemplary embodiment, the information on the statistical distribution of the directional information of the detections includes the derivative over time of directional information filtered by means of a filter function. The filter function can in particular be a filter for filtering statistical outliers. As a result, the change in the filtered directional information over time can be used as a decision-making basis for the object classification.

According to an exemplary embodiment, the classification is conducted at least on the basis of a first and a second threshold value, wherein the first threshold value indicates a threshold value for the information on the statistical distribution of the position information and the second threshold value indicates a threshold value for the information on the statistical distribution of the directional information of the detections. It is understood that more than two decision rules which are based on threshold values are enlisted as the decision-making basis for the object classification.

According to an exemplary embodiment, the first and second threshold values are determined by means of training data. The training data have object information and label information assigned to this object information. The label information indicates which object class the respective object is to be assigned to. Therefore, decision rules can be created by means of the training data, stating as of which thresholds of the information on the statistical distribution of the position information and information on the statistical distribution of the directional information a classification into the respective object classes can be carried out.

According to an exemplary embodiment, the classification is carried out by means of a decision tree or a random forest. As a result, an object classification can be carried out with little computing effort.

According to another exemplary embodiment, a neural network is used for the classification, wherein the neural network was trained by means of training data which have label information on the respective object classes.

According to another exemplary embodiment, a classification into the object classes "vehicle" and "not a vehicle" is carried out. As a result, objects which represent vehicles can be distinguished from other objects, for example, from the object classes "wall" or "curb."

According to another exemplary embodiment, depending on the result of the classification of the object, a height estimation of the object is conducted or not. In particular, no height estimation can be conducted regarding detections which refer to the object class "vehicle." As a result, the computing effort and the error rate can be minimized during the height estimation.

According to a further aspect, a system for classifying objects into object classes on the basis of information of at least one ultrasonic sensor of a vehicle is disclosed. The system has a computing unit which is configured to execute the following steps of:

a) receiving multiple detections of at least one ultrasonic sensor of a vehicle, wherein an item of position information and an item of directional information are assigned to each detection, wherein the position information indicates the reflection location at which an ultrasonic signal of the at least one ultrasonic sensor was reflected and wherein the directional information indicates the direction along which the ultrasonic signal propagates between the reflection location and the at least one ultrasonic sensor;
b) forming clusters of detections on the basis of the received detections, wherein one cluster includes multiple detections;
c) calculating information on the statistical distribution of the position information and information on the statistical distribution of the directional information of the detections assigned to the respective cluster; and
d) classifying the object into an object class on the basis of the information on the statistical distribution of the position information and on the statistical distribution of the directional information of the clusters.

According to yet another aspect, a vehicle having a system for classifying objects into object classes is disclosed.

Within the meaning of the invention, the expressions "approximately," "substantially" or "roughly" mean deviations from the exact value in each case by +/−10%, such as by +/−5%, and/or deviations in the form of changes which are insignificant to the function.

Further developments, advantages and possible applications of the present disclosure are also set out by the following description of exemplary embodiments and by the figures. All of the features described and/or pictured per se or in any combination are in principle the subject-matter of the invention, irrespective of their combination in the claims or references back thereto. The content of the claims is also made an integral part of the description.

BRIEF DESCRIPTION OF THE DRAWINGS

The present disclosure is explained in greater detail below on the basis of figures with reference to exemplary embodiments, wherein.

DETAILED DESCRIPTION

Figure 1:
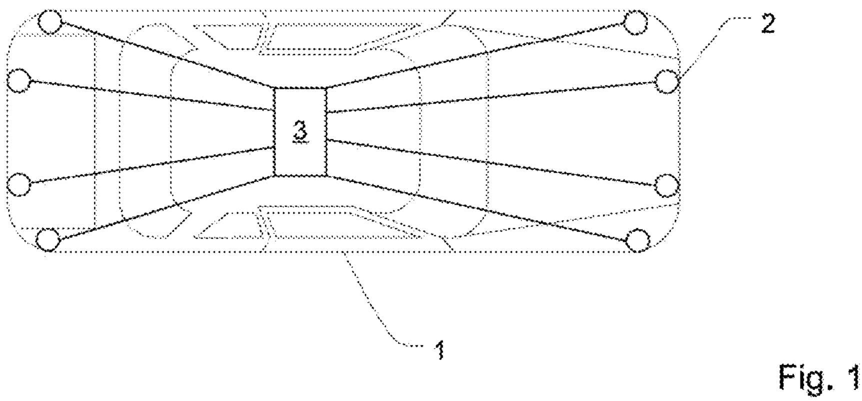
FIG. 1 shows, by way of example and schematically, a vehicle having ultrasonic sensor technology including multiple ultrasonic sensors distributed around the vehicle on the circumference and a computer unit for evaluating the information provided by the ultrasonic sensor technology.

FIG. 1 shows, by way of example and merely schematically, a vehicle 1. The vehicle 1 has a plurality of ultrasonic sensors 2 by means of which the surroundings are captured.

The ultrasonic sensors 2 are coupled to at least one computing unit 3, by means of which the method described below for classifying an object O into an object class is carried out.

Figure 2:
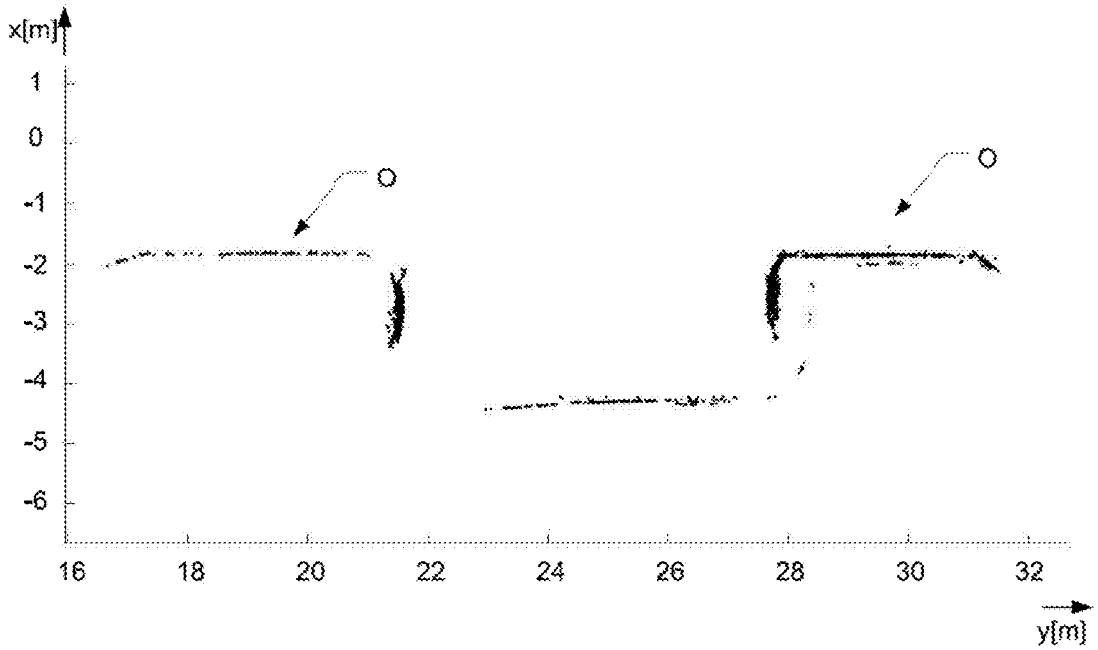
FIG. 2 shows, by way of example, a diagram which shows the position information of detections for a longitudinal parking system between two vehicles.

FIG. 2 shows, by way of example, a diagram in which a plurality of detections is entered which are captured by the ultrasonic sensors 2 of the vehicle 1 and assigned to multiple objects O. The detections refer, for example, to a longitudinal parking system in which a longitudinal parking space is formed between two vehicles. The linearly arranged detections between the two vehicles refers, for example, to a curb which laterally delimits the parking space.

A detection is represented by a point. The reflection location at which the detection occurred due to a reflection by a surrounding object is indicated by position information. The position information can include at least two coordinates, by means of which the reflection location is defined in a horizontal plane. These are in particular x and y coordinates which are plotted on the respective diagram axes in the diagram of FIG. 2. In other words, the position information is indicated in Cartesian coordinates. Alternatively, it is possible to indicate the position information in a cylindrical coordinate system or a spherical coordinate system.

The statistical distribution of the position information is enlisted for classifying an object.

If available, the position information can also contain information regarding the height of the object region at which the reflection occurred. In other words, the position information can indicate the reflection location in the three-dimensional space. The information on the third dimension (i.e., the height) can also be enlisted to classify the object.

An item of directional information is also determined in each case for the detections. The directional information indicates from which direction the detection was received. The directional information can, for example, be a spanned angle in the horizontal plane, which indicates the direction of a connecting line which connects the reflection location to the sensor position of the ultrasonic sensor which emitted the reflected ultrasonic signal and/or which received the reflected ultrasonic signal. The angle can, for example, be measured relative to an axis of coordinates, for example relative to the x axis. For example, the directional information can therefore include the angle which the connecting line, which connects the reflection location to the sensor position of the ultrasonic sensor, encloses with the x axis.

Figure 3:
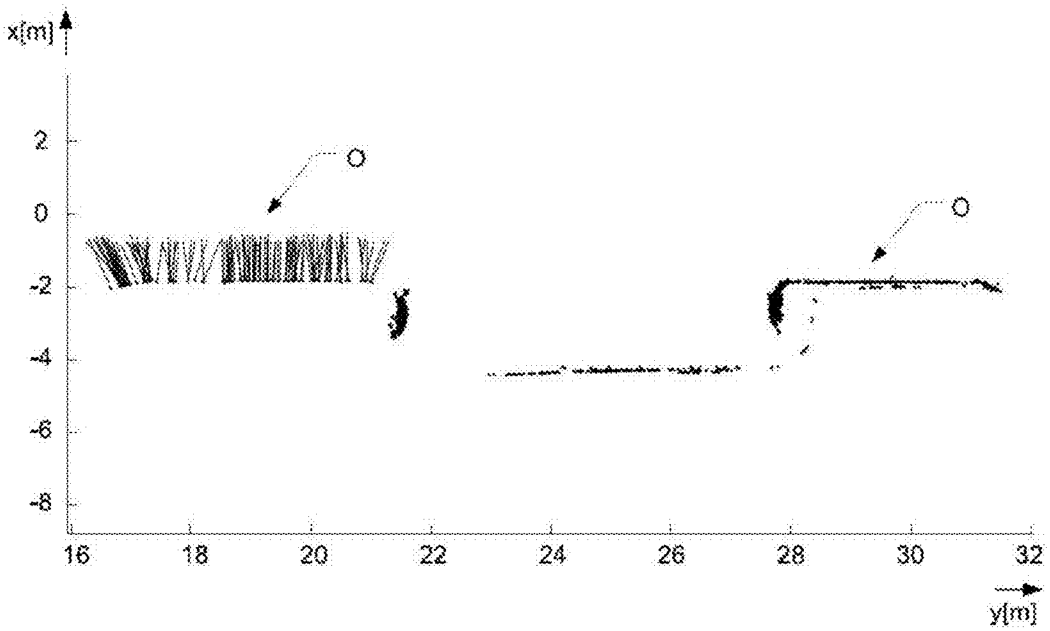
FIG. 3 shows, by way of example, a diagram which shows the position information and partially the directional information of detections for the longitudinal parking system according to FIG. 2.

FIG. 3 shows, by way of example, a diagram similar to that of FIG. 2, wherein an item of directional information is additionally assigned to each detection which is assigned to the left vehicle. The directional information is in each case signified by a line. The line indicates the direction in which the detection was determined. In other words, the line indicates the direction in which the ultrasonic sensor 2 was situated when emitting and/or receiving the ultrasonic signal. It should be noted that, due to the high propagation speed and the associated short transit time of the ultrasonic signal between emission and reception, it can be approximately assumed that the ultrasonic sensor 2 is situated in the same location when sending an ultrasonic signal and receiving the reflected components of this ultrasonic signal.

In order to assign multiple detections to one object, at least one cluster C is formed from the captured detections. Known clustering algorithms can be used to form a cluster, for example, density-based clustering methods, partitioning clustering methods, etc. In particular, a K-means clustering algorithm or a DBSCAN algorithm can be used to form the clusters.

Figure 4:
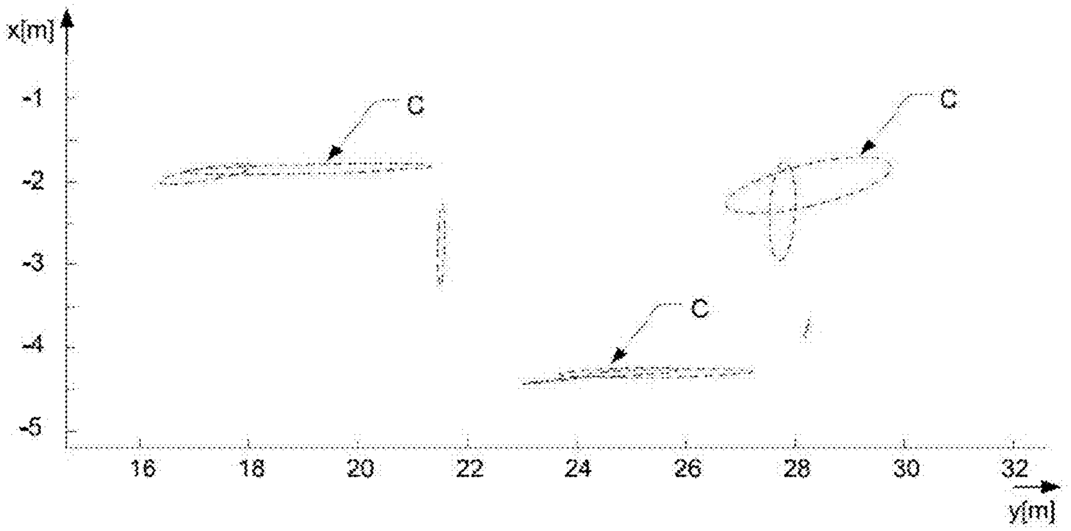
FIG. 4 shows, by way of example, multiple clusters which were determined on the basis of the detections shown in FIG. 2 and FIG. 3.

FIG. 4 illustrates multiple clusters C which were determined on the basis of the detections depicted in FIGS. 2 and 3. The ellipses depicted in FIG. 4 each represent the covariance matrix of the x, y coordinates of those detections assigned to the respective cluster C. The clusters C refer to locally connected groups of detections and may indicate how the respective group of detections is locally arranged in a horizontal plane (i.e., the x-y plane).

A threshold value may be predefined for the number of detections. The number of the detections which should form a cluster must exceed this threshold value. This can prevent a cluster from already being formed due to fewer detections.

Following the cluster formation, information on the statistical distribution of the position information and information on the statistical distribution of the directional information of the detections can be determined for the respective clusters.

In particular, the mean value of the position information is calculated for the respective clusters C. This mean value therefore indicates the center of the cluster. It can be determined, for example, by averaging the x and y coordinates of the detections of a cluster. In addition, the covariance to the x and y coordinates of the detections assigned to the respective cluster can be calculated. In other words, the two-dimensional Gaussian distribution of the x and y coordinates of the detections is calculated.

The information on the statistical distribution of the directional information of the detections of a cluster can include the mean value and the variance of the directional information of the detections of a cluster. In this case, the mean value and the variance can either be calculated directly or the directional information can be filtered prior to the calculation of the mean value and the variance, for example, a smoothing filtering or a filtering by means of which statistical outliers are filtered out.

Further information or variables which can be enlisted for classifying the objects can be calculated from the information on the statistical distribution of the position information and the information on the statistical distribution of the directional information.

For example, the determinant of the covariance matrix of the first and second coordinates of the position information can be calculated. This is larger in the case of multidimensionally shaped objects than in the case of linear objects. Therefore, the determinant of the covariance matrix can serve to distinguish between multidimensionally shaped objects and linear objects.

Furthermore, the eigenvalues of the covariance matrix of the first and second coordinates of the position information can be calculated. In particular, this produces a first and a second eigenvalue. The eigenvalues indicate the extension of the cluster C along its main axis and its auxiliary axis running perpendicularly thereto. In particular, the eigenvalues indicate the length of the main and auxiliary axis of an ellipse which can be used to reproduce the location and alignment of the cluster. These ellipses assigned to clusters C are depicted in FIG. 4.

Furthermore, the quotient of the first and second eigenvalues of the covariance matrix of the first and second coordinates of the position information can be calculated. The ratio of the eigenvalues provides an indication of whether it is a linear object or not, since the ratio of the eigenvalues differs considerably for linear objects and two-dimensionally shaped objects.

The variance of the directional information of the detections of a cluster likewise provides an indication of whether it is a linear object or a two-dimensionally shaped object. Thus, for example, the variance of the directional information is very small in the case of linear objects, and very high in the case of round objects such as posts or similar. In the case of vehicles, the variance of the directional information lies in the middle between the variance of the directional information of linear and round objects, since vehicles have both straight vehicle regions and diffusely reflecting regions, for example mirrors, door handles, etc.

In addition, the derivative over time of statistical properties of the directional information of the detections or of the filtered directional information of the detections can be determined, i.e., for example, the change in the mean value, the variance, etc.

The information on the statistical distribution of the position information and the information on the statistical distribution of the directional information may be determined iteratively, and indeed in such a way that the formation of clusters C is updated when one or more detections are received. As a result, updated clusters are obtained. The information on the statistical distribution of the position information and the information on the statistical distribution of the directional information of the detections assigned to a cluster are likewise updated following the updating of a cluster, i.e., recalculated on the basis of the detections newly added to the cluster.

The information on the statistical distribution of the position information and the information on the statistical distribution of the directional information of the detections can subsequently be enlisted to form decision rules, wherein the classification of the objects into object classes is conducted on the basis of the decision rules.

Training data can be used to form the decision rules. The training data have information on objects and label information assigned to the objects. The label information indicates which object class the respective object should be assigned to. The decision rules can in particular be threshold values. The height of the threshold values can be fixed on the basis of the training data.

The threshold values can be assigned to specific information on the statistical distribution of the position information or specific information on the statistical distribution of the directional information. The threshold values can in particular indicate that an item of information below the threshold value indicates a classification into a first object class and an item of information above the threshold value indicates a classification into a second object class.

A decision tree or a random forest can be deployed for classifying the objects.

The structure and the decision rules of the decision tree or of the random forest can be fixed by the training data.

Figure 5:
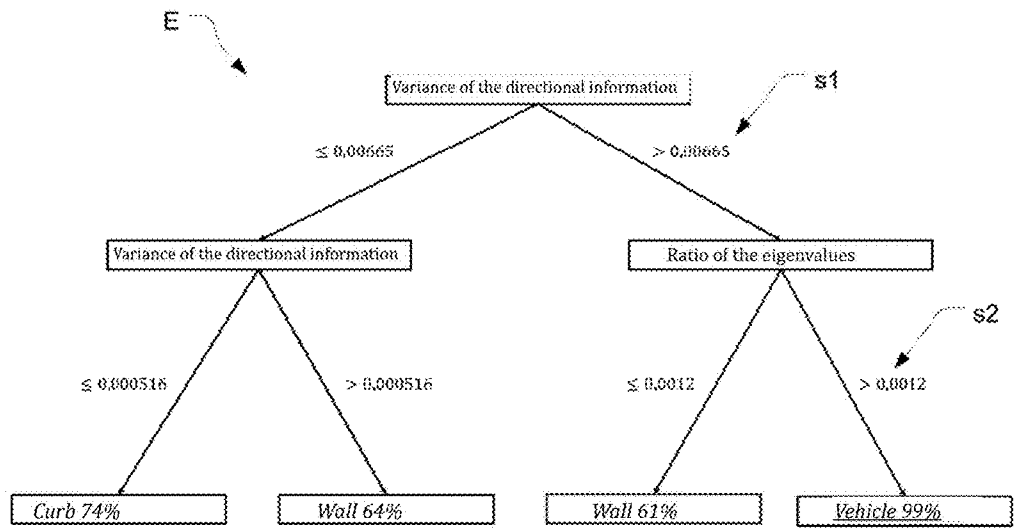
FIG. 5 shows, for example, a decision tree for classifying objects into object classes.

FIG. 5 shows, by way of example, a decision tree. The decision tree serves, by way of example, to classify the objects into the classes "curb," "wall" and "vehicle." In particular, the decision tree is used for classification into the object classes "vehicle" and "not a vehicle."

The decision rules of the decision tree refer to information on the statistical distribution of the position information and information on the statistical distribution of the directional information. The quotient of the first and second eigenvalues of the covariance matrix of the first and second coordinates of the position information, i.e., the ratio of the two eigenvalues of the covariance matrix, is used as information on the statistical distribution of the position information. The variance of the directional information is used as information on the statistical distribution of the directional information. On the basis of the information on the statistical distribution of the position information, the information on the statistical distribution of the directional information, and the threshold values which are assigned to this information, the detections of the respective cluster C can be assigned to an object class. Therefore, it can in particular be decided whether the detections of the recognized cluster C refer to the object class "vehicle" or not.

According to the decision tree of FIG. 5, if the variance of the directional information is greater than 0.00665 and the ratio of the eigenvalues is greater than 0.0012, it can be assumed with a probability of 99% that the detections of the cluster refer to a vehicle.

Following the classification of the objects or the clusters assigned to objects into object classes, a height estimation algorithm can be selectively performed on the basis of the information of the ultrasonic sensor technology. In particular, those detections which are assigned to clusters of the object class "vehicle" can be excluded from the height estimation in order to avoid incorrect estimations.

Figure 6:
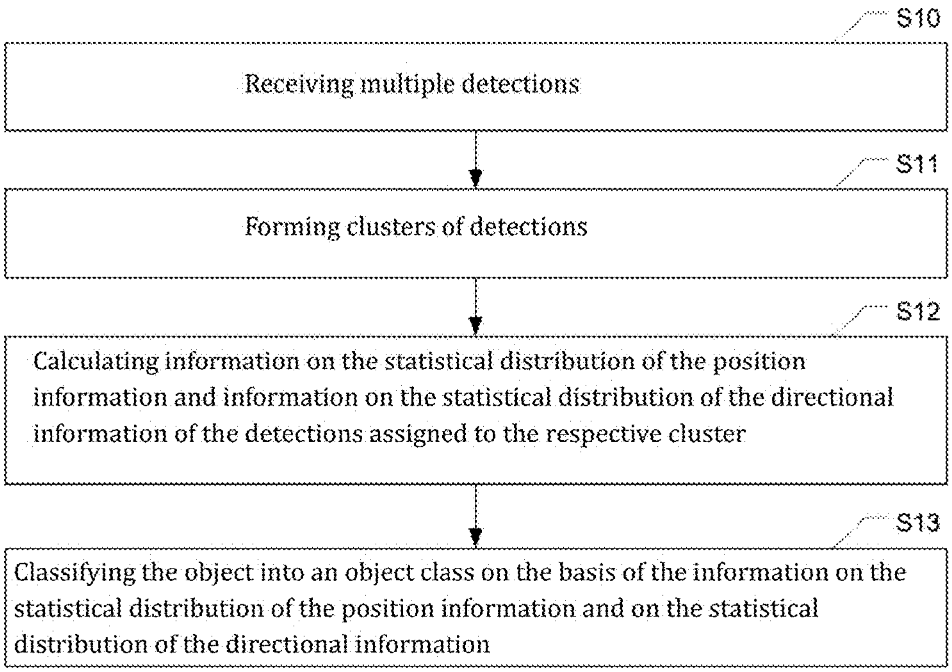
FIG. 6 shows, by way of example, a block diagram which illustrates the steps of the method for classifying objects into object classes.

FIG. 6 shows, in a schematic representation, the steps of a method according to the invention for classifying objects into object classes by means of the ultrasonic sensor technology of a vehicle.

Initially, multiple detections of at least one ultrasonic sensor of a vehicle are received (S10). An item of position information and an item of directional information are assigned to each detection. The position information indicates the reflection location at which an ultrasonic signal of the at least one ultrasonic sensor was reflected. The directional information indicates the direction along which the ultrasonic signal propagates between the reflection location and the at least one ultrasonic sensor.

Clusters of detections are subsequently formed on the basis of the received detections. One cluster includes multiple detections (S11).

Information on the statistical distribution of the position information and information on the statistical distribution of the directional information of the detections assigned to the respective cluster are subsequently calculated for the clusters (S12).

Finally, a cluster which is assigned to one object is classified into an object class, and indeed on the basis of the information on the statistical distribution of the position information and on the statistical distribution of the directional information (S13).

The invention has been described above using exemplary embodiments. It goes without saying that numerous changes as well as modifications are possible without leaving the scope of protection defined by the claims.

LIST OF REFERENCE NUMERALS

1 Vehicle
2 Ultrasonic sensor
3 Computing unit
C Cluster
E Decision tree
O Object
s1 First threshold value
s2 Second threshold value

The invention claimed is:

1. A method for classifying objects into object classes on the basis of information of at least one ultrasonic sensor of a vehicle, comprising:

a) receiving multiple detections of at least one ultrasonic sensor of a vehicle, wherein an item of position information and an item of directional information are assigned to each detection, wherein the position information indicates a reflection location at which an ultrasonic signal of the at least one ultrasonic sensor was reflected and wherein the directional information indicates a direction along which the ultrasonic signal propagates between the reflection location and the at least one ultrasonic sensor;

b) forming clusters of detections on the basis of the received detections, wherein one cluster comprises multiple detections;

c) calculating information on a statistical distribution of the position information and information on a statistical distribution of the directional information of the detections assigned to the respective cluster;

d) classifying an object into an object class on the basis of the information on the statistical distribution of the position information and on the statistical distribution of the directional information of the clusters; and e) selectively estimating a height of the object based on a result of the classification of the object, including refraining from performing a height estimation for the object if the object is classified as a vehicle.

2. The method according to claim 1, wherein the position information comprises at least one first coordinate and at least one second coordinate, wherein the information on the statistical distribution of the position information comprises information which is based on a covariance matrix of the first and second coordinates of the position information.

3. The method according to claim 2, wherein the information on the statistical distribution of the position information comprises eigenvalues of the covariance matrix of the first and second coordinates of the position information.

4. The method according to claim 3, wherein the information on the statistical distribution of the position information comprises a ratio of the eigenvalues of the covariance matrix of the first and second coordinates of the position information.

5. The method according to claim 1, wherein the information on the statistical distribution of the directional information of the detections comprises a variance of the directional information.

6. The method according to claim 1, wherein the information on the statistical distribution of the directional information of the detections comprises a derivative over time of the directional information.

7. The method according to claim 1, wherein the information on the statistical distribution of the directional information of the detections comprises a derivative over time of directional information filtered by a filter function.

8. The method according to claim 1, wherein the classification is conducted at least on the basis of a first threshold value and a second threshold value, wherein the first threshold value indicates a threshold value for the information on the statistical distribution of the position information and the second threshold value indicates a threshold value for the information on the statistical distribution of the directional information of the detections.

9. The method according to claim 8, wherein the first and second threshold values are determined by training data which have label information on the respective object classes.

10. The method according to claim 1, further comprising carrying out the classification by a decision tree or a random forest.

11. The method according to claim 1, further comprising using a neural network for the classification, wherein the neural network being trained by training data which have label information on the respective object classes.

12. The method according to claim 1 further comprising carrying out a classification into the object classes "vehicle" and "not a vehicle".

13. The method according to claim 1, further comprising selectively estimating a height of the object depending on a result of the classification of the object.

14. A system for classifying objects into object classes on the basis of information of at least one ultrasonic sensor of a vehicle, wherein the system has a computing unit which is configured to execute a method comprising:

receiving multiple detections of at least one ultrasonic sensor of a vehicle, wherein an item of position information and an item of directional information are assigned to each detection, wherein the position information indicates a reflection location at which an ultrasonic signal of the at least one ultrasonic sensor was reflected and wherein the directional information indicates a direction along which the at least one ultrasonic signal propagates between the reflection location and the at least one ultrasonic sensor;

forming clusters of detections on the basis of the received detections, wherein one cluster comprises multiple detections;

calculating information on a statistical distribution of the position information and information on the statistical distribution of the directional information of the detections assigned to the respective cluster;

classifying the object into an object class on the basis of the information on the statistical distribution of the position information and on the statistical distribution of the directional information of the clusters; and selectively estimating a height of the object based on a result of the classification of the object, including refraining from performing a height estimation for the object if the object is classified as a vehicle.

15. A vehicle comprising a system according to claim 14.

* * * * *